UNITED STATES PATENT OFFICE.

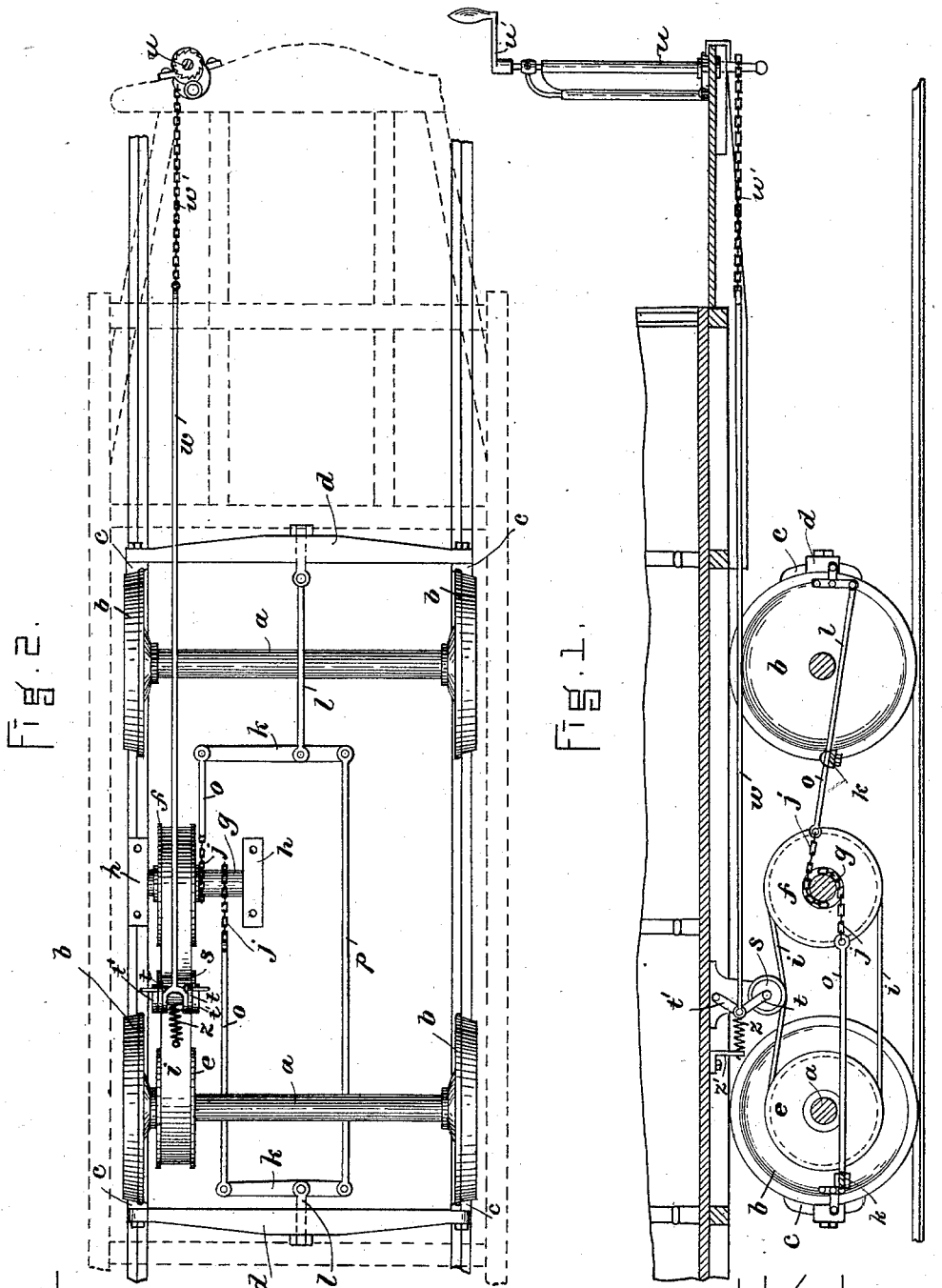

WILLIAM E. BADGER, OF QUINCY, MASSACHUSETTS.

BRAKE MECHANISM FOR STREET-CARS.

SPECIFICATION forming part of Letters Patent No. 422,693, dated March 4, 1890.

Application filed January 6, 1890. Serial No. 336,047. (No model.)

*To all whom it may concern:*

Be it known that I, WILLIAM E. BADGER, of Quincy, in the county of Norfolk and State of Massachusetts, have invented certain new and useful Improvements in Brake-Operating Mechanisms for Street-Railway Cars, of which the following is a specification.

This invention relates to brakes for street-cars, and particularly to that class of brakes in which the rotation of one of the axles is caused to apply the brake-shoes to the wheel by means of an attachment operated by the driver or other attendant on the street-car.

The invention consists in the improved means, hereinafter described, whereby the driver is enabled by moving a lever to put the brake-shoes in connection with one of the axles of the car, and thereby cause the rotation of said axle to move the shoes and press them against the wheels, thereby stopping the car.

Of the accompanying drawings, forming a part of this specification, Figure 1 represents a side elevation of a portion of a street-car provided with my improvements, and Fig. 2 represents a bottom plan view of the same.

The same letters of reference indicate the same parts in all the figures.

In the drawings, $a\ a$ represent the axles, $b\ b$ the wheels, and $c\ c$ the brake-shoes, of a street-car, the brake-shoes being attached to bars $d\ d$, which are suspended from the body of the car by links in the usual or any suitable manner.

$e$ represents a pulley affixed to one of the axles $a$, and $f$ represents a similar pulley in line with the pulley $e$ and attached to a shaft $g$, which is journaled in bearings $h\ h$, attached to the bottom of the car.

$i$ represents a strong belt of any suitable material, preferably leather, arranged to run upon the pulleys $e$ and $f$, said belt being retained upon the pulleys by flanges on the latter. The belt is normally loose, so that when the car is running the pulley $e$, rotating with the axle $a$, to which it is affixed, will slip within the belt and the latter will not be moved by the rotation of said pulley.

To the shaft $g$ are attached the ends of chains $j\ j$, which form parts of a series or system of connections between the shaft $g$ and the brake-beams $d\ d$, the other members of said system of connections being levers $k\ k$, pivoted on rods $l\ l$, which are connected with the brake-beams, rods $o\ o$, connecting the chains $j\ j$ to the longer arms of said levers, and a rod $p$, connecting the shorter arms of the levers, the arrangement being such that when the shaft $g$ is rotated in the direction required to wind the chains $j\ j$ upon said shaft the brake-beams will be moved to press the shoes $c\ c$ against the wheels $b\ b$, and when the shaft $g$ is released the pressure exerted upon the brake-beams will be released and the brake-shoes will be forced away from the wheels by springs arranged as usual in street-cars to prevent the shoes from rubbing on the wheels.

$s$ represents a pulley, which is journaled in bearings formed in the ends of links $t\ t$, which are pivoted to the lower ends of similar links $t'\ t'$, the upper ends of which are pivoted to the body of the car. Said links $t$ and $t'$ constitute toggle-joints, which, when straightened by the movement into alignment with each other, depress the pulley $s$ forcibly upon the belt $i$ and cause said pulley to so tighten the belt and increase its friction upon the pulley $e$ as that the rotation of the pulley will move the belt and cause the latter to rotate the pulley $f$ and the shaft $g$.

The depression of the pulley $s$, above described, is effected by means of a crank-rod $u$, journaled in bearings on the fender or other suitable portion of the car, the upper end of said rod having a crank $u'$ within convenient reach of the driver, and a rod $w$ and chain $w'$, connecting the lower end of said crank-rod with the meeting ends of the toggle-joint links $t\ t'$. A rotary movement of the crank-rod $u$ causes the rod $w$ to move forward, and thereby throw the links $t\ t'$ into alignment, thus depressing the pulley $c$, tightening the belt $i$, and causing the rotation of the shaft $g$ and the application of the brake-shoes to the wheels.

The crank-rod $u$ may be locked at any desired point by a ratchet and pawl, as usual in means for operating ordinary brakes. When the crank-rod is released, a spring $z$, connected to the meeting ends of the toggle-joint links and to a fixed support $z'$ on the car, draws back the said meeting ends, thereby throwing the links out of alignment and raising the pulley s.

I am aware that it is not new to connect the brake-shoes of a car with one of the axles thereof through intermediate mechanism, which is made operative by the act of the driver or other attendant to cause the rotation of the car-axle to apply the brake-shoes to the wheels; hence I do not claim, broadly, the combination, with a car-axle and the brake-shoes, of intermediate mechanism consisting in part of a belt and means for tightening the same, whereby power may be imparted from the axle to the brake-shoes. The combination and arrangement of parts adapted by me to produce the result above described are, however, simpler and more compact and effective than any other of which I am aware.

My improvements are especially applicable to electric cars, the arrangement of the operating mechanism shown by me being such that it can be applied to a car having an electric motor without interference with said motor and its necessary connections.

It will be seen that a rotation of the shaft $g$ in either direction will produce the desired result. For example, if the car is moving backward downhill, the tightening of the belt will cause the shaft $g$ to rotate backwardly and first loosen and then tighten the chains $j\,j$, the tightening of the chains applying the brake-shoes, as above described.

I claim—

1. In a street-railway car, the combination, with the wheels, axles, and brake-shoes, of a pulley $e$, attached to one of the axles, a shaft $g$, journaled in bearings on the bottom of the car, a pulley $f$, affixed to said shaft, a belt $i$, running upon the pulleys $e$ and $f$, a system of connections between the shaft $g$ and the brake-shoes, whereby the rotation of said shaft in either direction is caused to apply the brake-shoes to the wheels, and the pulley $s$ and mechanism controlled by an attendant on the car for moving the same, said pulley being arranged to tighten the belt and cause the latter to communicate motion from the axle having the pulley $e$ to the shaft $g$, as set forth.

2. The combination, with the axles, wheels, and brake-shoes of a car, of a shaft $g$, journaled in bearings on the body of a car, a system of connections between said shaft and the brake-shoes, a belt connecting a pulley on said shaft with a pulley on one of the axles, a pulley $s$, toggle-joints connecting said pulley with the body of the car, and means controlled by an attendant on the car for throwing the links of said toggle-joint into and out of alignment with each other, thereby depressing and raising said pulley, as set forth.

3. The combination, with the axles, wheels, and brake-shoes of a car, of a shaft $g$, journaled in bearings on the body of the car, a system of connections between said shaft and the brake-shoes, a belt connecting a pulley on said shaft with a pulley on one of the axles, a pulley $s$, toggle-joints connecting said pulley with the body of the car, a crank-rod $u$, journaled in bearings at the end of the car, a connection between said crank-rod and the meeting ends of the links of the toggle-joints, means for locking said crank-rod, and a spring arranged to throw the links of the toggle-joints out of alignment, and thereby raise the pulley $s$.

4. The combination, with the wheels, axles, and brake-shoes of a car, of a shaft $g$, journaled in bearings on the body of a car, a belt connecting a pulley on said shaft with a pulley on one of the axles, means controlled by an attendant on the car for tightening and releasing said belt, and chains $j\,j$, levers $k\,k$, rods $o\,o, p$, and $l\,l$, and beams $d\,d$, constituting a system of connections between the shaft $g$ and the brake-shoes, as set forth.

In testimony whereof I have signed my name to this specification, in the presence of two subscribing witnesses, this 1st day of January, A. D. 1890.

WILLIAM E. BADGER.

Witnesses:
C. F. BROWN,
W. C. RAMSAY.